INVENTOR:
Peter G. Ivanchich
BY
ATTORNEYS

INVENTOR:
Peter G. Ivanchich
BY
ATTORNEYS

United States Patent Office 3,452,847
Patented July 1, 1969

3,452,847
NEUTRAL CLUTCH STRUCTURE FOR A MULTIPLE RATIO POWER TRANSMISSION MECHANISM
Peter G. Ivanchich, Dearborn, Mich., assignor to Ford Motor Company, Dearborn, Mich., a corporation of Delaware
Filed Mar. 21, 1968, Ser. No. 715,073
Int. Cl. F16d 23/04, 47/02, 11/04
U.S. Cl. 192—48.4                        6 Claims

ABSTRACT OF THE DISCLOSURE

A multiple speed ratio, torque-delivery driveline for an automotive vehicle having a neutral clutch situated between the vehicle engine and multiple ratio gearing in the driveline wherein the neutral clutch includes a disengageable, positive-drive clutch construction for connecting a neutral clutch friction disc to the power transmission shaft for the gearing, the friction disc being disconnected from the vehicle engine upon disengagement of the clutch thereby reducing to a minimum the polar moment of inertia of the rotary elements in the gear system during speed ratio changes.

GENERAL DESCRIPTION OF THE INVENTION

My invention is adapted to be used in a manually-controlled, multiple-ratio, power transmission mechanism for an automotive vehicle having an internal combustion engine and synchronized gear elements in the torque delivery path. The driveline includes an internal combustion engine with its crankshaft connected to the power input shaft for the multiple ratio gearing through a neutral clutch. The neutral clutch includes a friction surface on the engine flywheel. The pressure plate can be moved out of engagement with the friction disc by driver operated, clutch-controlling linkage members.

Provision is made for disengaging the hub of the clutch disc from the power input shaft of the transmission gearing by employing a positive-drive, disengageable, clutch mechanism having first clutch teeth carried by the hub of the friction disc and second clutch teeth carried by a clutch sleeve which in turn is slidably and drivably connected to the power input shaft of the gearing. As the clutch sleeve is moved in one direction, the clutch disc is disconnected from the driveline. As the clutch sleeve is moved in the other direction, provision is made for synchronizing the motion of the sleeve with respect to the clutch hub so that the clutch teeth can engage with a smooth clutching action.

The mechanism for actuating the clutch sleeve is common to the mechanism for releasing the clutch pressure from the pressure plate. The disengageable clutch is moved to a torque interrupting position when the neutral clutch is fully disengaged. Upon movement of the clutch operating linkage in the clutch applying direction, the disengageable clutch for the friction disc becomes reapplied as synchronism is established.

Continued motion of the clutch actuating member in the clutch applying direction will cause the neutral clutch to become re-engaged. During the interval in which the clutch disc is disengaged, the operator can actuate the gearing motion controlling elements to initiate speed ratio changes. It is not necessary to compensate for the polar moment of inertia of the rotating clutch disc and its hub during such ratio changes. This facilitates a smooth ratio change and simplifies greatly the problem of synchronizing the motion of the torque delivery elements in the driveline during ratio changes.

BRIEF DESCRIPTION OF THE FIGURES OF THE DRAWING

FIGURE 1A shows clutch engaged position, and FIGURE 1B shows the clutch disengaged position.

FIGURE 3A shows the clutch engaged position and FIGURE 3B shows the clutch disengaged position.

PARTICULAR DESCRIPTION OF THE INVENTION

Figure 1A:
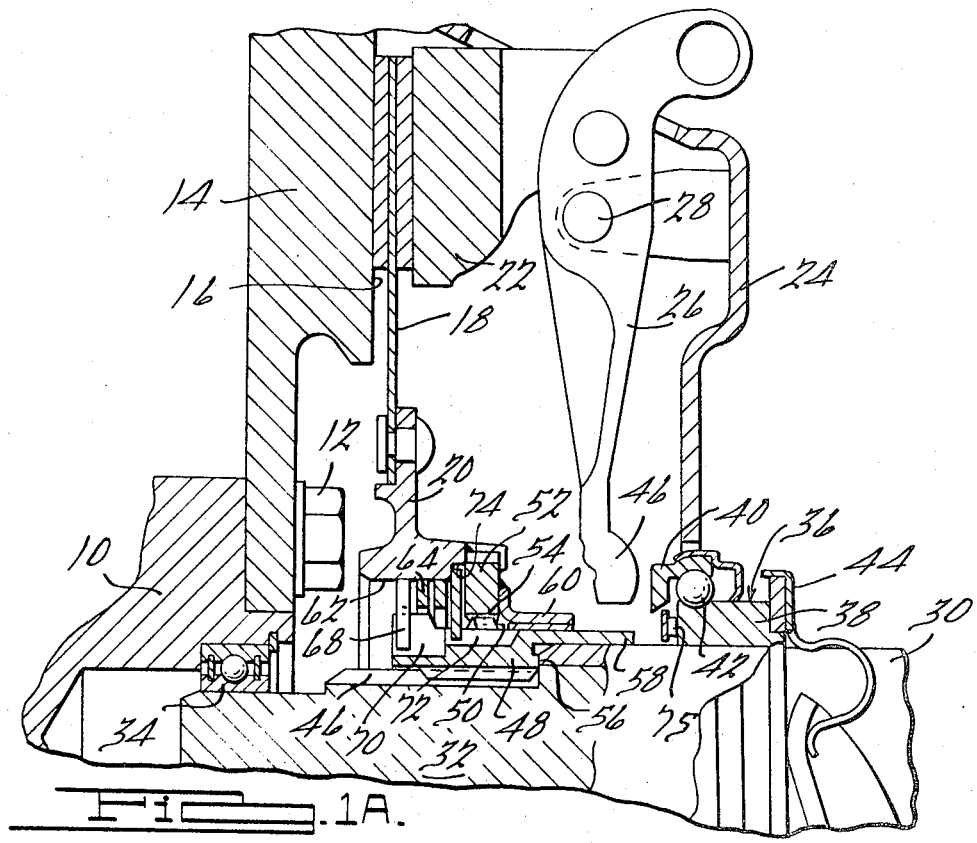
FIGURES 1A and 1B show in partial cross-sectional form an assembly view embodying the improvements of my invention.
Figures 1B, 2:
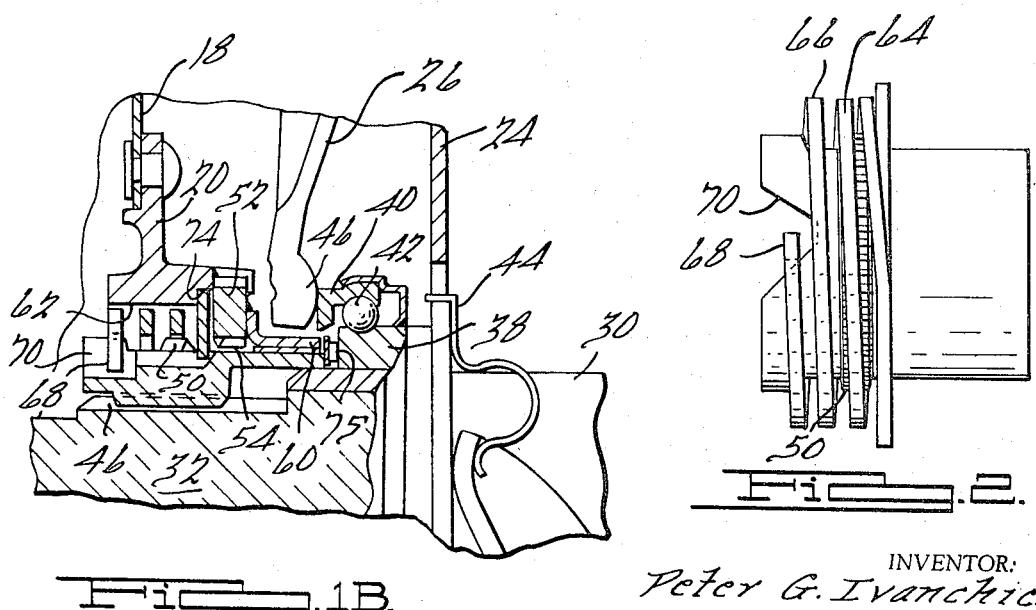
FIGURE 2 is a synchronizer clutch spring used in the structure of FIGURE 1.

In FIGURES 1A and 1B, numeral 10 designates the flanged end of an internal combustion engine crankshaft. It is connected drivably by means of bolts 12 to an engine flywheel 14. The flywheel includes a friction clutch surface 16.

Situated adjacent the surface 16 is a friction clutch disc 18 which is secured to the central hub 20. An annular friction plate 22 is disposed adjacent the disc 18. It is spring urged into clutching engagement with the disc 18 to establish a driving connection between the disc 18 and the engine crankshaft 10.

The flywheel carries a clutch housing shown in part at 24. Pivoted on the housing 24 is plurality of clutch release levers 26, although only one is shown in FIGURE 1. The levers are pivoted at 28. One end is adapted to withdraw the pressure plate 22 from the disc 18 as the levers 26 are pivoted in a clockwise direction.

The multiple ratio power transmission gearing includes a housing to which is connected a relatively stationary clutch bearing sleeve shaft 30. Piloted within the sleeve shaft 30 is a power transmission input shaft 32. The end of the shaft 32 is piloted by means of bearing 34 within a bearing opening formed in the end of the crankshaft 10.

A clutch thrust bearing is identified generally by reference 36. It includes a bearing inner race 38 that is slidpositioned in the sleeve shaft 30. It includes also an outer race 40 and thrust bearing elements in the form of balls 42 situated between the inner and outer races.

The inner race 38 can be slidably positioned in a left-hand direction on the sleeve shaft 30 by a clutch actuator linkage system that comprises a thrust bearing 44.

The radially inward end of clutch release levers 26, which are indicated at 46, are engaged by the outer race 40 as the throw-out bearing 36 is moved in a left-hand direction.

The shaft 32 is splined at one section, as indicated at 46. This permits a driving connection with a clutch sleeve 48 whch is internally splined. To permit registry with the splines at 46, the outer periphery of the sleeve 48 is formed with external clutch teeth 50, the right-hand ends of which are chamfered as indicated.

The hub 20 carries a clutch element in the form of a ring 52 which carries internally splined teeth 54. These register with the teeth 50 when the sleeve 48 is moved in the right-hand direction with the end 56 engaging an adjacent shoulder formed on the end of the stationary sleeve 30.

The right-hand end 58 of the sleeve 48 surrounds and is supported by the sleeve 30.

The hub 20, as well as the ring 52, may include an auxiliary bearing member 60 which is journalled rotatably on the outer peripheral surface of the sleeve 48.

A hub 20 is formed with a cylindrical opening at its center, which defines a cylindrical friction surface 62. Located in the opening is a spring 64 having flat outer surfaces 66 on each convolution. The left-hand end of the spring 64 is formed radially inwardly at 68 so that it registers with a cam recess 70 formed in the left-hand end of the sleeve 48. The right-hand end of the spring 64 registers with a slot or other radial opening 72 in the sleeve 48. The right-hand convolution of the spring 64 is formed with a relatively large diameter so that it is received within a counterbore opening 74 formed in the hub 20. The counterbore forms a shoulder against which the cooperating spring convolution is rested, thereby holding the spring 64 against unresistrained axial displacement.

The recess 70 is formed with a cam surface on each peripheral side thereof.

When the vehicle operator releases the transmission neutral clutch at the beginning of the gear shift interval, he actuates the throw-out bearing 36 in a left-hand direction. This causes the release levers 26 to oscillate in a clockwise direction until the neutral clutch disc 18 is released. Continued movement of the clutch throw-out bearing 36 in a left-hand direction will cause the end 58 of the sleeve 48 to be engaged by the inner race 38. If desired, the thrust washer, preferably in the form of a radial needle bearing, can be provided between the end 58 and the race 38 as indicated at 75.

Continued movement of the clutch throw-out bearing 38, as the clutch-operated linkage is overtravelled, will result in desengagement of the cltuch teeth 54 and 50. This releases the clutch hub 20 from its driving connection with shaft 32. At the same time the sleeve 48 will stretch the spring 64. The cam recess 70 cams against the end 68 of the spring 64 thereby reducing the effective diameter of the convolution. Both the stretching and the rotary adjustment of the spring 64 will effect a disengagement of the frictional relationship between the outer surface of the convolutions and the cylindrical surface 62 of the hub.

When the operator desires to re-engage the clutch, the clutch throw-out bearing 36 is allowed to moved in a right-hand direction. Initially, this will cause the convolutions of spring 64 to drag against the surface 62 thereby accelerating the hub 20 and the disc 18 until both of them rotates at a speed that is substantially the same as the speed of the sleeve 48, and hence the same as the speed of the shaft 32. After this synchronism is established by reason of the frictional synchronizing action of the spring 64, the teeth of the disengageable clutch may engage without clash. During the interval in which the clutch hub 20 is disengaged from the shaft 32, the vehicle operator may shift the transmission gearing to establish various ratios. It is not necessary for the synchronizer clutch structure in the transmission mechanism to compensate for the polar moment of inertia for the clutch.

Figure 3A:
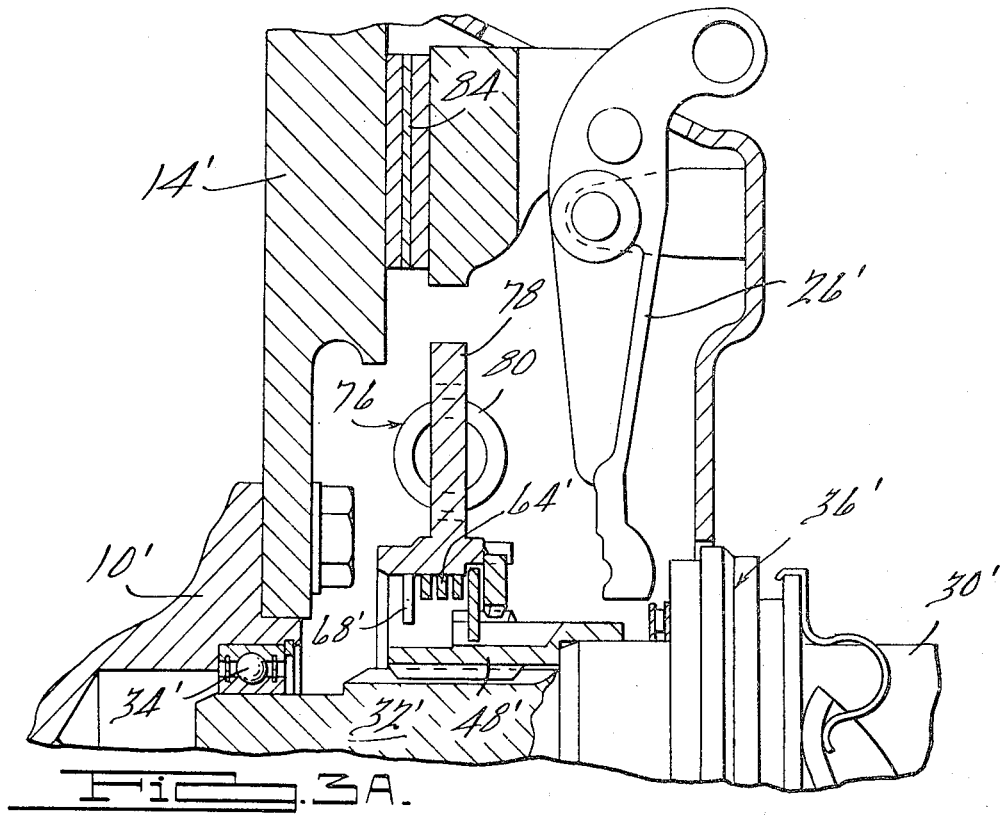
FIGURES 3A and 3B show a modification of the clutch mechanism of FIGURE 1.
Figure 3B:
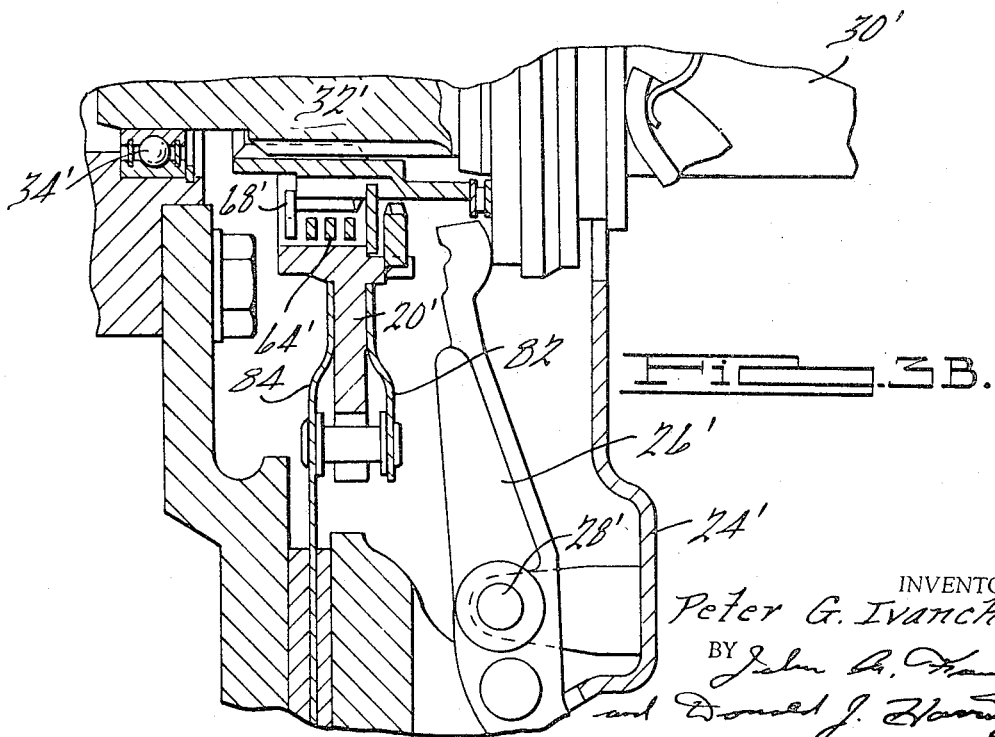

In FIGURES 3A and 3B I have shown an alternate construction that has parts that are common to the FIGURE 1A construction. The common elements have been indicated by corresponding reference characters although in the view of the alternate constructions, prime notations have been added.

The clutch sleeve for the releasable clutch and the clutch disc hub, as seen at 48', is splined by means of a sliding spline connection to the power input shaft 32'. The left-hand end of the sleeve 48' is adapted to engage directly the left-hand convolution 68' for the synchronizer coil spring 64'. The right-hand end of the spring 64' is anchored to the hub 20'. The spring 64', therefore, will be extended as sleeve 48' is shifted in a left-hand direction.

As the spring 64' is extended, its outside diameter decreased, thereby disengaging the clutching action between the sleeve 48' and the hub 20'. The change in diameter of the spring is due to the stretching of the spring. This is in contrast to the FIGURE 2 arrangement where the decrease in diameter during the declutching operation is due to the angular displacement of the end convolution of the spring by the camming action of the cam recess 70 as well as due to the stretching action of the spring 64.

If it is desired, the clutch disc can be provided with a damper spring assembly as indicated generally in FIGURE 3A by reference character 76. This comprises radial fingers 78 which form a part of the hub 20' and springs 80 situated between the fingers 78. The clutch disc at its radially inward region comprises hub plates 82 and 84 which are pinned together on either side of the hub 20. The pins establish a driving connection with the radially outward ends of the fingers 78. The plates 82 are apertured to permit entry of the springs 80. The springs thus establish a resilient connection between the clutch disc hub and the transmission power input shaft 32'.

Having thus described preferred embodiments of my invention, what I claim and desire to secure by U.S. Letters Patent is:

1. In an automotive vehicle driveline having an engine and torque transmitting gearing, a power input shaft for said gearing, a clutch plate connected drivably to said engine, a friction clutch disc positioned adjacent said clutch plate, a pressure plate situated adjacent said clutch disc, a hub member, said clutch disc being secured to said hub member, said hub member being journalled for rotation about the axis of said power input shaft, internal clutch teeth carried by said hub member, a clutch sleeve member having external clutch teeth formed thereon, means for dirvably connecting said sleeve member to said power input shaft, said sleeve member being adapted for movement along said power input shaft to establish engagement and disengagement of said clutch teeth, and a synchronizer clutch friction element carried by one of said members and adapted to engage frictionally the other member, said friction element being positioned in the line of motion of said sleeve when the latter is moved to a clutch tooth disengaging position whereby said friction element is positioned out of frictional contact with said other member, said friction element engaging said other member to establish synchronism between said clutch teeth as said sleeve is moved to a clutch-teeth engaging position.

2. In an automotive vehicle driveline having an engine and torque transmitting gearing, a power input shaft for said gearing, a clutch plate connected drivably to said engine, a friction clutch disc positioned adjacent said clutch plate, a pressure plate situated adjacent said clutch disc, a hub member, said clutch disc being secured to said hub member, said hub member being journalled for rotation about the axis of said power input shaft, internal clutch teeth carried by said hub member, a clutch sleeve member having external clutch teeth formed thereon, means for drivably connecting said sleeve member to said power input shaft, said sleeve member being adapted for movement along said power input shaft to establish engagement and disengagement of said clutch teeth, a synchronizer clutch friction element carried by one of said members and adapted to engage frictionally the other member, said friction element being positioned in the line of motion of said sleeve when the latter is moved to a clutch tooth disengaging position whereby said friction element is positioned out of frictional contact with said other member, said friction element engaging said other member to establish synchronism between said clutch teeth as said sleeve is moved to a clutch-teeth engaging position, and personally operably clutch release lever means connected to said pressure plate for applying a clutch disengaging force thereon, said clutch release lever means being situated in the line of motion of said sleeve member whereby said pressure plate is moved to a clutch disengaging position when said sleeve member is moved in a direction toward a position corresponding to disengagement of said clutch teeth.

3. The combination as set forth in claim 1 wherein said friction element is in the form of a coil spring, one end of said coil spring being anchored to said sleeve, said sleeve inhibiting rotation of said coil spring with respect to it, the opposite end of said spring being situated in the line of motion of said sleeve, said hub having a cylindrical clutch surface formed therein surrounding said spring, said spring frictionally engaging said cylindrical surface when said opposite end is free of said sleeve, said sleeve stretching said spring to decrease the diameter thereof and to eliminate the frictional relationship between said spring and said hub as said sleeve is moved in a direction to effect disengagement of said clutch teeth.

4. The combination as set forth in claim 2 wherein said friction element is in the form of a coil spring, one end of said coil spring being anchored to said sleeve, said sleeve inhibiting rotation of said coil spring with respect to it, the opposite end of said spring being situated in the line of motion of said sleeve, said hub having a cylindrical clutch surface formed therein surrounding said spring, said spring frictionally engaging said cylindrical surface when said opposite end is free of said sleeve, said sleeve stretching said spring to decrease the diameter thereof and to eliminate the frictional relationship between said spring and said hub as said sleeve is moved in a direction to effect disengagement of said clutch teeth.

5. The combination as set forth in claim 3 wherein the end of said sleeve has formed thereon a cam recess defining a cam surface, said opposite end of said spring extending radially inwardly into said cam recess, said cam surface engages said radially inwardly extending end upon movement of said sleeve in a direction corresponding to disengagement of said clutch teeth whereby said spring is rotated about its axis relative to its anchored end and whereby it is stretched in the direction of its axis, said rotation and said stretching resulting in a decrease in the effective outside diameter of said spring following disengagement of said clutch teeth.

6. The combination as set forth in claim 4 wherein the end of said sleeve has formed thereon a cam recess defining a cam surface, said opposite end of said spring extending radially inwardly into said cam recess, said cam surface engages said radially inwardly extending end upon movement of said sleeve in a direction corresponding to disengagement of said clutch teeth whereby said spring is rotated about its axis relative to its anchored end and whereby it is stretched in the direction of its axis, said rotation and said stretching resulting in a decrease in the effective outside diameter of said spring following disengagement of said clutch teeth.

References Cited

UNITED STATES PATENTS

| 2,001,856 | 5/1935 | Thomson. | |
| 2,137,977 | 11/1938 | Kattwinkel | 192—48.7 |
| 2,976,974 | 3/1961 | Blyth. | |
| 3,219,161 | 11/1965 | Villeple et al. | 192—48.5 XR |

CARLTON R. CROYLE, Primary Examiner.

A. D. HERRMANN, Assistant Examiner.

U.S. Cl. X.R.

192—53, 76, 48.5, 48.7